US011368866B2

(12) United States Patent
He et al.

(10) Patent No.: US 11,368,866 B2
(45) Date of Patent: Jun. 21, 2022

(54) SINGLE MEASUREMENT GAP FOR MASTER NODE AND SECONDARY NODE MEASUREMENTS

(71) Applicant: Nokia Technologies Oy, Espoo (FI)

(72) Inventors: Jing He, Beijing (CN); Li Zhang, Beijing (CN); Tero Henttonen, Espoo (FI); Amaanat Ali, Espoo (FI); Lars Dalsgaard, Oulu (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 16/640,832

(22) PCT Filed: Aug. 21, 2017

(86) PCT No.: PCT/CN2017/098296
§ 371 (c)(1),
(2) Date: Feb. 21, 2020

(87) PCT Pub. No.: WO2019/036841
PCT Pub. Date: Feb. 28, 2019

(65) Prior Publication Data
US 2020/0252819 A1 Aug. 6, 2020

(51) Int. Cl.
*H04W 24/10* (2009.01)
*H04W 76/15* (2018.01)
*H04W 36/00* (2009.01)

(52) U.S. Cl.
CPC ........ *H04W 24/10* (2013.01); *H04W 36/0094* (2013.01); *H04W 76/15* (2018.02)

(58) Field of Classification Search
CPC ......... H04W 36/0077; H04W 36/0061; H04W 36/0016; H04W 36/0022; H04W 68/02;
(Continued)

(56) References Cited

U.S. PATENT DOCUMENTS 6,580,113 B2 * 6/2003 Watanabe ......... H01L 27/10855
257/306
7,372,842 B2 * 5/2008 Kim .................. H04W 36/0094
370/345
(Continued)

FOREIGN PATENT DOCUMENTS

CN 106550378 A 3/2017
EP 2953392 A1 12/2015
(Continued)

OTHER PUBLICATIONS

IEEE Standard for Local and Metropolitan Area Networks Part 16: Air Interface for Fixed Broadband Wireless Access Systems Published in: IEEE Std 802.16-2004 (Revision of IEEE Std 802.16-2001) (pp. 0_1-857) Jan. 2004 (Year: 2004).*
(Continued)

*Primary Examiner* — William D Cumming
(74) *Attorney, Agent, or Firm* — Harrington & Smith

(57) ABSTRACT

Various communication systems may benefit from appropriate sharing of resources amongst multiple nodes. For example, certain wireless communication systems may benefit from using a single measurement gap for master node and secondary node measurements in a multi-radio-access-technology dual connectivity scenario, or similar scenarios. A method can include determining, by a first network node, that a gap pattern is existing in a second network node. The method can also include enquiring, by the first network node to the second network node, whether the gap pattern can be used for a new measurement. The method can further include configuring, by the first network node, a user equipment to perform the new measurement in the gap pattern, based on a response from the second network node to the enquiring.

19 Claims, 7 Drawing Sheets

(58) Field of Classification Search
CPC . H04W 68/14; H04W 48/18; H04W 72/1215; H04W 88/12; H04W 36/0094; H04W 36/14; H04W 36/0069; H04W 60/00; H04W 48/02; H04W 48/12; H04W 36/022; H04W 36/026; H04W 36/0007; H04W 48/08; H04W 24/10
USPC ...... 455/453, 436, 423.1, 403, 422.1, 435.2; 370/345, 331, 338, 254, 252, 328
See application file for complete search history.

(56) References Cited

U.S. PATENT DOCUMENTS

| | | | | |
|---|---|---|---|---|
| 8,644,826 | B2* | 2/2014 | Futaki | H04W 36/0007 455/435.2 |
| 8,861,433 | B2* | 10/2014 | Burbidge | H04W 36/0016 370/328 |
| 8,873,407 | B2* | 10/2014 | Burbidge | H04W 48/08 370/252 |
| 9,426,697 | B2* | 8/2016 | Burbidge | H04W 84/042 |
| 9,554,315 | B2* | 1/2017 | Burbidge | H04W 48/18 |
| 10,028,178 | B2* | 7/2018 | Burbidge | H04W 60/00 |
| 10,200,896 | B2* | 2/2019 | Choi | H04W 24/08 |
| 10,412,614 | B2* | 9/2019 | Tenny | H04W 24/10 |
| 10,951,293 | B2* | 3/2021 | Zhao | H04B 7/0619 |
| 2001/0040251 | A1* | 11/2001 | Watanabe | H01L 27/10855 257/306 |
| 2002/0049048 | A1* | 4/2002 | Haberland | H04W 88/12 455/403 |
| 2003/0108027 | A1* | 6/2003 | Kim | H04L 1/1854 370/345 |
| 2010/0304748 | A1* | 12/2010 | Henttonen | H04W 36/0077 455/436 |
| 2010/0316000 | A1* | 12/2010 | Burbidge | H04W 36/0022 370/328 |
| 2010/0316034 | A1* | 12/2010 | Burbidge | H04W 36/0016 370/338 |
| 2011/0130150 | A1* | 6/2011 | Kolding | H04W 48/18 455/453 |
| 2011/0256824 | A1* | 10/2011 | Futaki | H04W 36/026 455/436 |
| 2012/0015646 | A1* | 1/2012 | Burbidge | H04W 48/08 455/422.1 |
| 2012/0188907 | A1* | 7/2012 | Dayal | H04W 72/1215 370/254 |
| 2014/0228027 | A1 | 8/2014 | Kuo | |
| 2015/0055625 | A1* | 2/2015 | Burbidge | H04W 68/02 370/331 |
| 2016/0037418 | A1* | 2/2016 | Burbidge | H04W 36/0061 370/331 |
| 2016/0248533 | A1* | 8/2016 | Li | H04J 11/0086 |
| 2017/0026877 | A1* | 1/2017 | Burbidge | H04W 36/0016 |
| 2018/0324650 | A1* | 11/2018 | Burbidge | H04W 48/12 |
| 2019/0098489 | A1* | 3/2019 | Shi | H04W 72/0453 |
| 2019/0101615 | A1* | 4/2019 | Tenny | G01S 5/0236 |
| 2019/0124533 | A1* | 4/2019 | Tenny | H04L 5/0048 |
| 2019/0393948 | A1* | 12/2019 | Zhao | H04B 7/0682 |
| 2020/0014523 | A1* | 1/2020 | Huang | H04L 5/0053 |
| 2020/0252819 | A1* | 8/2020 | He | H04W 24/10 |
| 2020/0275326 | A1* | 8/2020 | Ma | H04W 76/30 |
| 2021/0045019 | A1* | 2/2021 | Burbidge | H04W 36/0022 |
| 2021/0058131 | A1* | 2/2021 | Zhu | H04B 7/0408 |
| 2021/0226750 | A1* | 7/2021 | Cheng | H04W 36/0088 |
| 2021/0296321 | A1* | 9/2021 | Heo | H01L 23/5329 |

FOREIGN PATENT DOCUMENTS

| | | | |
|---|---|---|---|
| WO | 2016/153286 A1 | 9/2016 | |
| WO | 2016/182527 A1 | 11/2016 | |
| WO | WO2019162513 A1 * | 2/2019 | |
| WO | WO-2019178805 A1 * | 9/2019 | ............ H04W 24/10 |
| WO | WO-2019194729 A1 * | 10/2019 | ........ H04W 36/0069 |

OTHER PUBLICATIONS

S. K. Sharma and X. Wang, "Toward Massive Machine Type Communications in Ultra-Dense Cellular IoT Networks: Current Issues and Machine Learning-Assisted Solutions," in IEEE Communications Surveys & Tutorials, vol. 22, No. 1, pp. 426-471, Jan. 2020 , doi: 10.1109/COMST.2019.2916177. (Year: 2020).*
"Summary of Email Discussion [97bis#10][NR] MN/SN Measurement Coordination", 3GPP TSG-RAN WG2 meeting #98, R2-1704138, Agenda: 10.2.3, NTT DOCOMO, Inc, May 15-19, 2017, pp. 1-15.
"LS on UE Measurement Capabilities Across LTE and NR", 3GPP TSG-RAN WG2 meeting #98, R2-1706140, TSG-RAN WG2, May 15-19, 2017, 2 pages.
"Report and Summary of Email Discussion [86#29][LTE/DC] RRM Measurements", 3GPP TSG-RAN WG2 meeting #87, R2-143347, Agenda: 7.1.3.2, Huawei, Aug. 18-22, 2014, pp. 1-33.
"Measurement Gap Configuralion in MR-DC", 3GPP TSG-RAN2 meeting AH2, R2-1706347, Agenda: 10.2.3, OPPO, Jun. 27-29, 2017, pp. 1-4.
"Considerations for the MN and the SN to Configure Measurement Objects Consistently on the same Carrier", 3GPP TSG-RAN WG2 #NR Ad hoc#2, R2-1706446, Agenda: 10.2.3, Spreadtrum Communications, Jun. 27-29, 2017, 3 pages.
"Measurement Coordination between LTE and NR", 3GPP TSG-RAN WG2 #NR AdHoc, R2-1706997, Agenda: 10.2.3, CMCC, Jun. 27-29, 2017, 2 pages.
"Measurement Coordination for LTE-NR DC", 3GPP TSG-RAN WG3 #NR2 AdHoc, R2-1707408, Agenda: 10.2.3, Huawei, Jun. 27-29, 2017, 3 pages.
"3rd Generation Partnership Project; Technical Specification Group Radio Access Network; Evolved Universal Terrestrial Radio Access (E-UTRA); Study on measurement gap enhancement for LTE (Release 13)", 3GPP TR 36.894, V13.0.0, Jan. 2016, pp. 1-23.
International Search Report and Written Opinion received for corresponding Patent Cooperation Treaty Application No. PCT/CN2017/098296, dated May 22, 2018, 9 pages.
Extended European Search Report received for corresponding European Patent Application No. 17922731.9, dated May 14, 2021, 10 pages.
"Discussion on measurement gaps for NR", 3GPP TSG-RAN WG4 Meeting #84, Nokia, R4-1707459, Agenda Item: 9.6.4, Aug. 21-25, 2017, 4 pages.
"Measurement Gap Configuration in MR-DC", 3GPP TSG-RAN2#99, OPPO, R2-1707759, Agenda Item: 10.2.3, Aug. 21-25, 2017, pp. 1-4.

* cited by examiner

US 11,368,866 B2

SINGLE MEASUREMENT GAP FOR MASTER NODE AND SECONDARY NODE MEASUREMENTS

RELATED APPLICATION

This application was originally filed as PCT Application No. PCT/CN2017/098296, filed on Aug. 21, 2017.

BACKGROUND

Field

Various communication systems may benefit from appropriate sharing of resources amongst multiple nodes. For example, certain wireless communication systems may benefit from using a single measurement gap for master node and secondary node measurements in a multi-radio-access-technology dual connectivity scenario, or similar scenarios.

Description of the Related Art

The long term evolution (LTE) mechanism of measurement gap setting before release 14 (Rel-14) is that one gap pattern is configured to the user equipment (UE) for all working frequencies. The UE is not required nor expected to transmit/receive any data on any serving cell during a gap used to perform inter-frequency measurement or inter-RAT measurement. In Rel-14 a number of new gap patterns were agreed in LTE, for example, per-component carrier (CC) gap mechanism that one gap pattern can be configured to the UE for a subset of serving cells.

In LTE dual connectivity (DC), as the radio resource control (RRC) is located in MN node only, all measurements are configured by MeNB to the UE, including measurement to MeNB's serving frequencies, measurement to SeNB's serving frequencies, and measurement of non-serving frequencies. LTE DC measurement may configure a single measurement gap for all configured measurements which need a gap. The MeNB decides the gap pattern and informs SeNB, which SeNB stops any data scheduling during the gap.

SUMMARY

According to certain embodiments, a method can include determining, by a first network node, that a gap pattern is existing in a second network node. The method can also include enquiring, by the first network node to the second network node, whether the gap pattern can be used for a new measurement. The method can further include configuring, by the first network node, a user equipment to perform the new measurement in the gap pattern of the second network node or in a gap pattern of the first network node, based on a response from the second network node to the enquiring.

In certain embodiments, a method can include configuring, by a second network node, a gap pattern for a user equipment. The method can also include informing, by the second network node to a first network node, that the gap pattern is configured. The method can further include receiving, by the second network node from the first network node, an enquiry regarding whether the gap pattern can be used for a new measurement. The method can additionally include conditionally responding, by the second network node, to the enquiry based on usage of the gap pattern.

A method, according to certain embodiments, can include receiving, by a user equipment, instructions from a first network node to use a gap pattern configured by a second network node for a new measurement. The method can also include determining, by the user equipment, whether using the gap pattern as instructed is possible. The method can further include informing the first network node, by the user equipment, whether the gap pattern usage is possible.

According to certain embodiments, a method can include receiving, by a user equipment, a gap pattern configuration from a network node. The method can also include informing, by the user equipment, the network node regarding usage of the gap pattern for measurements by the user equipment.

An apparatus, in certain embodiments, can include at least one processor and at least one memory including computer program code. The at least one memory and the computer program code can be configured to, with the at least one processor, cause the apparatus at least to perform a process. The process can include any of the above-described methods.

According to certain embodiments, an apparatus can include means for performing a process. The process can include any of the above-described methods.

In certain embodiments, a computer program product can encode instructions for performing a process. The process can include any of the above-described methods.

A non-transitory computer-readable medium can, according to certain embodiments, be encoded with instructions that, when executed in hardware, perform a process. The process can include any of the above-described methods.

BRIEF DESCRIPTION OF THE DRAWINGS

For proper understanding of the invention, reference should be made to the accompanying drawings, wherein.

DETAILED DESCRIPTION

Figure 1:
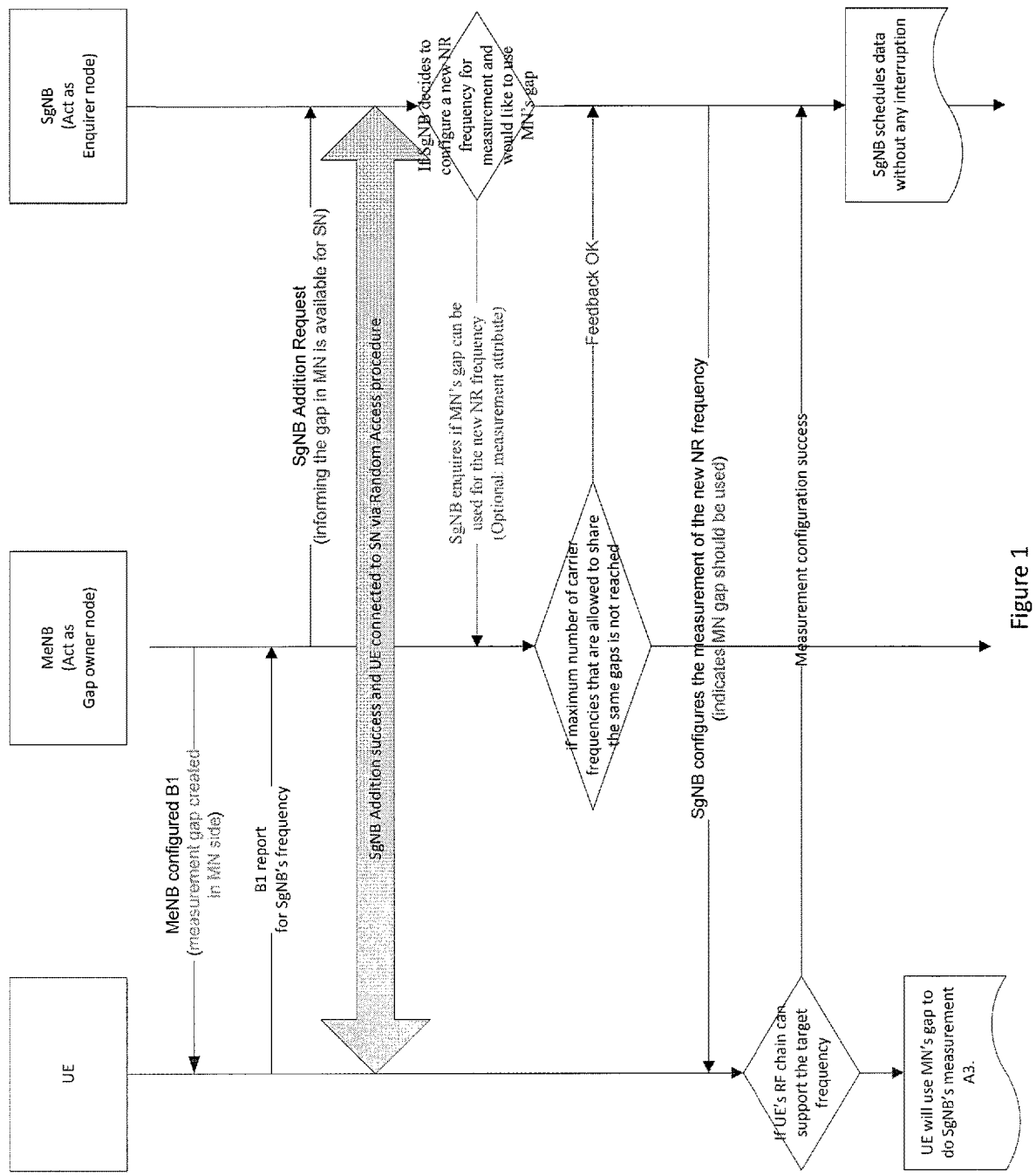
FIG. 1 illustrates a success case for a secondary base station using the master base station's gap, according to certain embodiments.

For measurement gap coordination in multi-radio access technology (RAT) dual connectivity (MR-DC), measurement gap may need to be coordinated between master node (MN) and secondary node (SN) for same new radio (NR)'s frequency as measurement objects may be configured by MN and SN independently. For two measurement objects configured by MeNB and SeNB independently but for different frequencies as measurement objects configured by MN and SN independently, the network may need to configure one single measurement gap pattern for one radio frequency (RF) chain, either in the LTE side or in NR side, to enable UE to measure these two different frequencies. A benefit is that the leg without gap can continue the normal data scheduling without data interruption, which is different from the LTE DC mechanism as mentioned above.

Using single gap does not mean that all inter-RAT and intra-RAT measurements always need to be measured by the gaps of one leg. Too many frequencies to be measured by one single gap may lead to longer measurement delay of each measured object and then degrade measurement latency and measurement result reporting performance. Especially for high priority measurements, for example measurement of coverage related frequency layers, too late measurement report to MN or SN may lead to late handover triggering and handover failure. So, there may be an upper limitation to the number of frequencies that can be measured using one gap.

As in MR DC case, two network entities can configure measurements independently. To use a single gap for measurements of carriers configured from MN and SN with reasonable measurement performance, network entities coordination may be necessary.

Certain embodiments provide an inter-node gap coordination enquiry procedure, which can be applied for all multi-RAT (MR) dual connectivity (DC) cases and a new radio (NR)-NR DC case. In the following discussion, a gap owner node can refer to, in MR DC, one network node (gNB or eNB) that has created the gap for measurement. Likewise, in the following discussion, an enquirer node, in MR DC, can refer to one network node (eNB or gNB) that wants to use other node's gap for its own measurement. Thus, certain embodiments may provide a coordination procedure to support the smart configurations of gaps, which allows using a single gap for measurements configured by different nodes in DC, and meanwhile allows control of measurement performance.

When one network node, an enquirer node, wants to configure one new measurement configuration to a user equipment (UE) and currently there is one gap pattern enabled in another network node, a gap owner node, the enquirer node can send an enquiry to the gap owner node. This enquiry can be sent via the Xx interface between the gap owner node e.g. a master Node B (MeNB) and the enquirer node, e.g. a secondary Node B (SeNB), to check if the existing gap pattern already assigned by the gap owner node can be used for the new measurement. The enquiry may include necessary information for evaluation, such as target frequency, measurement type, and the like.

When receiving the enquiry, the gap owner node can evaluate whether the current gap pattern has reached a measurement upper limitation based on a pre-defined threshold for the concerned measurement type.

If a current assigned gap can support measurements of the concerned type, the gap owner node can return positive feedback to the enquirer node. The enquirer node can configure the corresponding measurement to the UE. When the UE receives the configuration, if the UE's radio frequency (RF) capability can support measurement of the configured frequency with the existing gap pattern in the gap owner node, the UE can use the existing gap to do the measurement. The UE may or may not need to indicate the network. The RF capability of the UE may be unknown or invisible to the network. Otherwise, if the RF capability cannot support the measurement, the UE can inform the enquirer node who then may need to configure a new gap configuration from the enquirer node side.

If a current existing gap pattern cannot support more measurements of the concerned type, the gap owner node can return negative feedback to the enquirer node. The enquirer node can configure or enable a measurement gap to the UE in its own side, and the UE can use the new gap to do the measurement.

Alternatively, the network may configure UE with a measurement configuration including a gap pattern reflecting the targeted performance. The UE can enable the gap in the enquirer node side automatically if this is necessary, e.g. based on the UE capabilities, based on the pre-configured gap configuration to do measurement and can inform the network accordingly, whether the gaps are needed or not.

The pre-defined threshold is one kind of the maximum number of measurement frequencies using one gap of per UE, per RAT or per component carrier (CC), which can be configured by operator or standardized in specification. The maximum number of measurement frequencies using one gap can be set for different measurement types, shown as one kind of combination format, such as X+Y+Z measurements supported to using one indicated gap. X is the maximum number of Measurement A attribute, Y is the maximum number of Measurement B attribute and Z is the maximum number of Measurement C attribute. Each of the number X, Y or Z can include frequencies of same or different RATs, for example X frequencies with Measurement A attribute can include X1 LTE carriers and X2 NR carriers, with X=X1+X2. Three attributes is just an example, and the invention is not limited to this example.

The enquirer node can also simply configure a gap pattern (GP) even without an inter-node coordination procedure. The UE can evaluate, e.g. based on UE implementation, capability and configuration, whether the UE can use an existing gap pattern to fulfil the minimum measurement performance without the new GP. If so, the UE can inform the gNB that the new GP is implicitly released or enabled. Alternatively, the UE may inform that the new GP is taken into use.

Using addition of a new measured carrier by SN as example, the MeNB is the gap owner node and SgNB is the enquirer node in FIGS. 1 through 4.

FIG. 1 illustrates a success case for a secondary base station using the master base station's gap, according to certain embodiments. As shown in FIG. 1, MeNB can offer its own gap to be used by SgNB's measurement. SgNB can use the gap successfully and continue data scheduling without interruption after measurement is configured.

Figure 2:
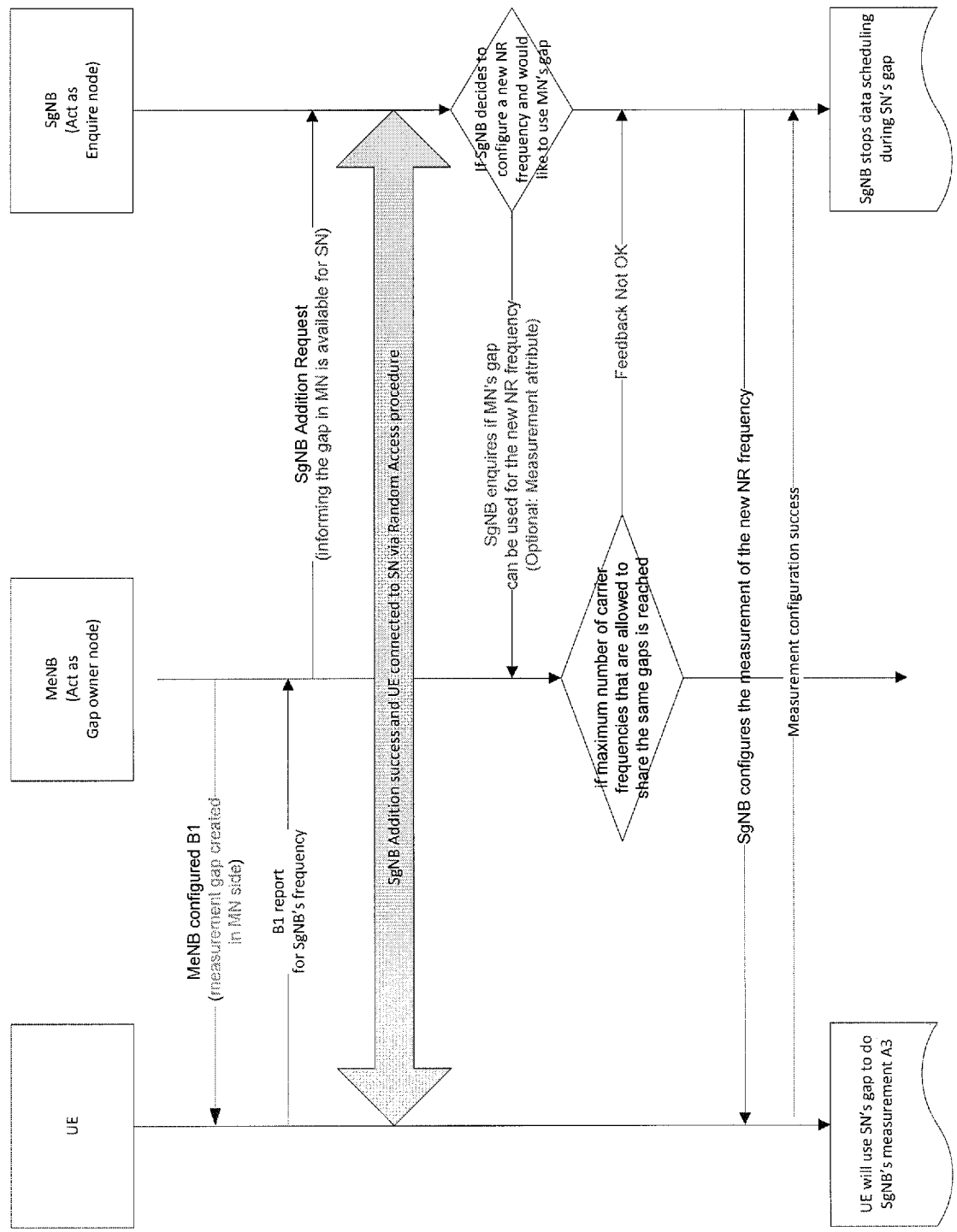
FIG. 2 illustrates a first failure case, in which master base station does not permit the secondary base station to use its gap, according to certain embodiments.

FIG. 2 illustrates a first failure case, in which master base station does not permit the secondary base station to use its gap, according to certain embodiments. As shown in FIG. 2, MeNB does not permits its own gap to be used by SgNB's measurement e.g. because this will lead to measurement delay performance exceeding the pre-defined threshold, and instead provides a not OK feedback message. SgNB can create its own gap for SgNB's measurement and may have to stop data scheduling during the gap after the measurement configured.

Figure 3:
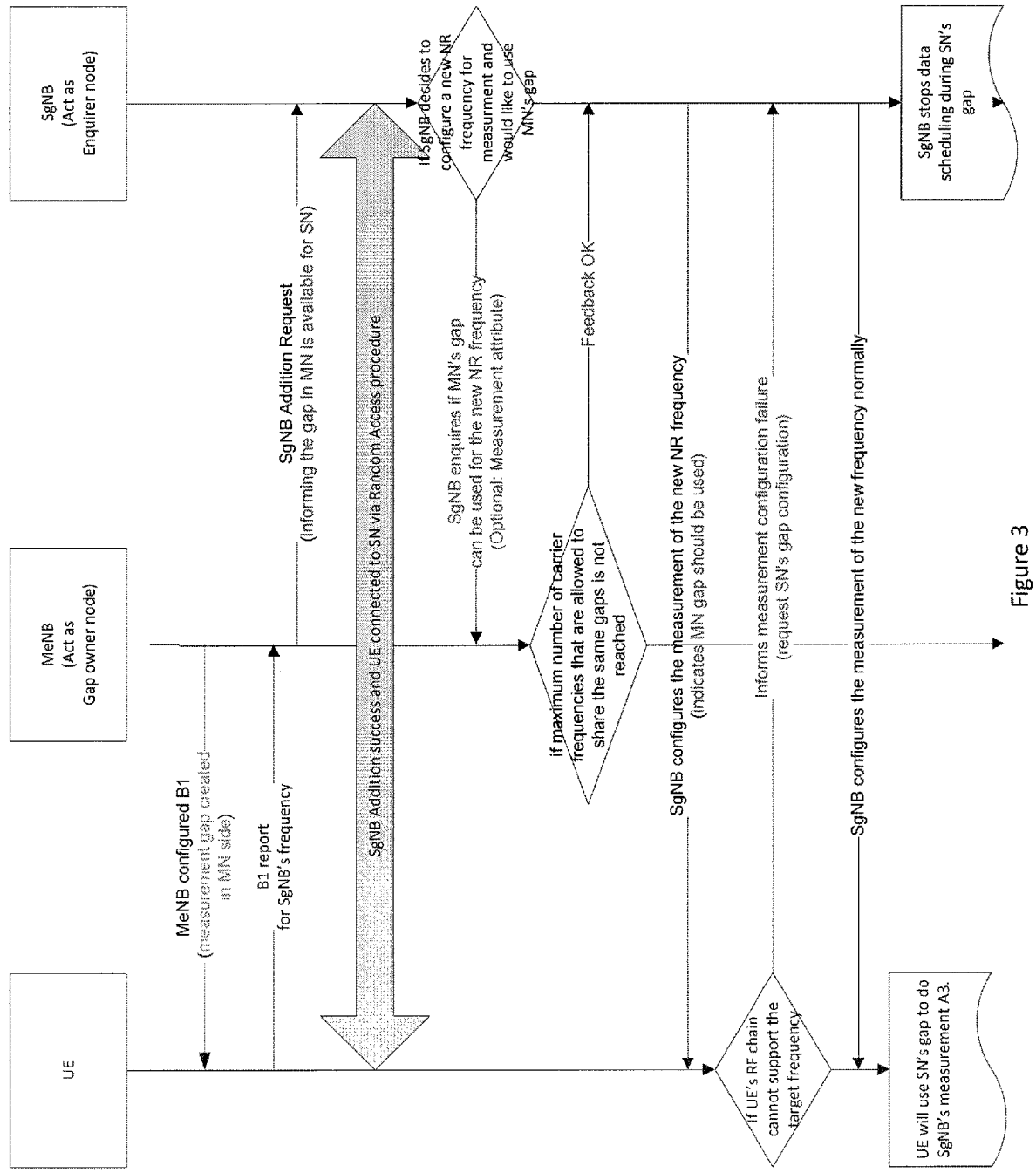
FIG. 3 illustrates a second failure case, in which the master base station permits the secondary base station to use its gap, but the user equipment does not support it, according to certain embodiments.

FIG. 3 illustrates a second failure case, in which the master base station permits the secondary base station to use its gap, but the user equipment does not support the new measurement in the gap provided by the master base station, according to certain embodiments. As shown in FIG. 3, the MeNB permits its own gap to be used by SgNB's measurement. UE's RF chain for which the MeNB gap is allocated or configured, however, does not support the target frequency. Thus, the UE requests SgNB to configure its own gap for SgNB's measurement.

Figure 4A:
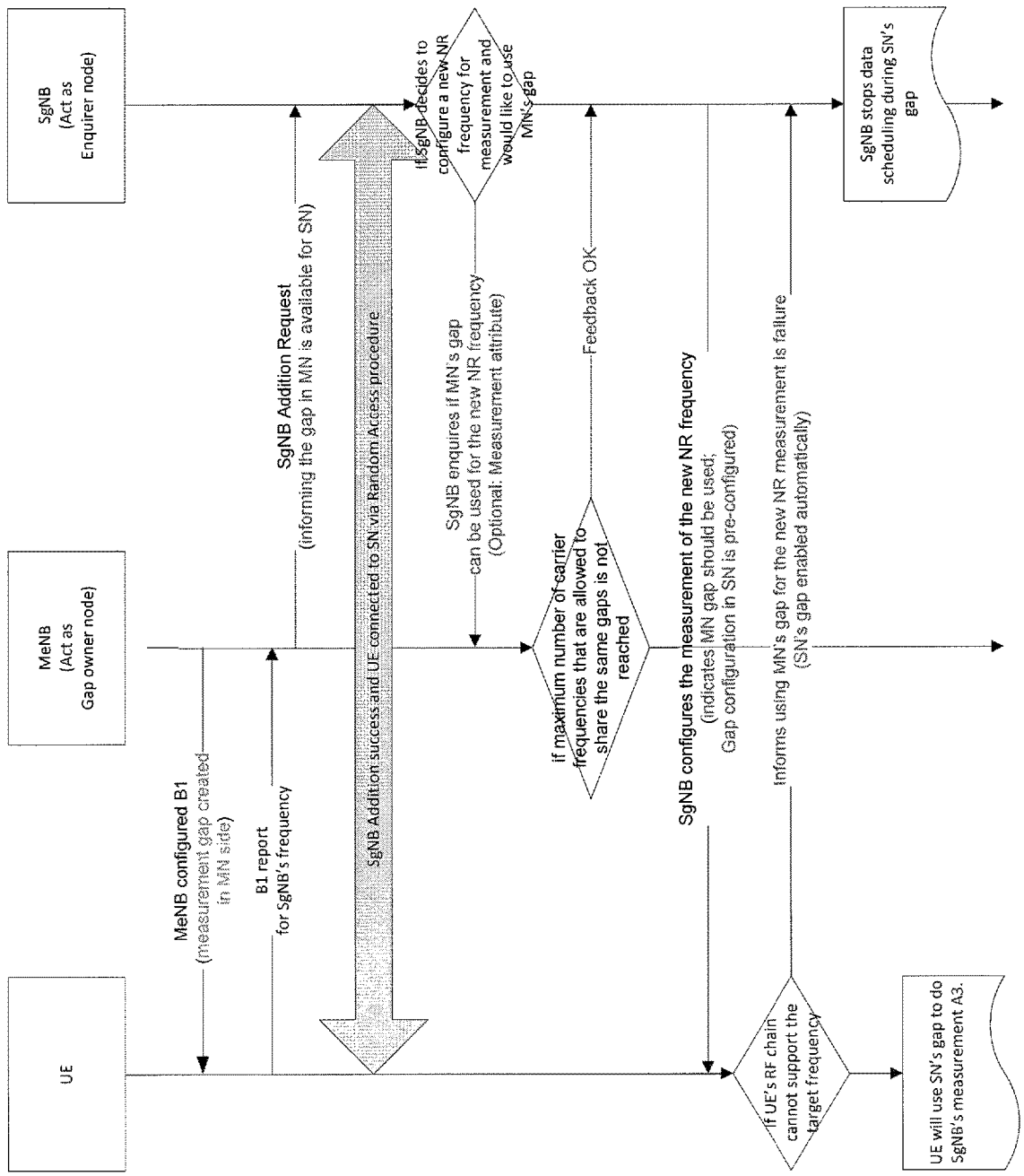
FIG. 4A illustrates a variation on the second failure case, in which the user equipment automatically enables a pre-configured gap, according to certain embodiments.

FIG. 4A illustrates a variation on the second failure case, in which the user equipment automatically enables a pre-configured gap, according to certain embodiments. As shown in FIG. 4A, the MeNB can permit its own gap to be used by SgNB's measurement but the due to UE capability restrictions, e.g. UE's RF chain, UE may not support the target frequency. In this case, the UE may automatically enable a pre-configured gap in the SN side for SgNB's measurement and may inform SgNB that the pre-configured gap is enabled.

Figure 4B:
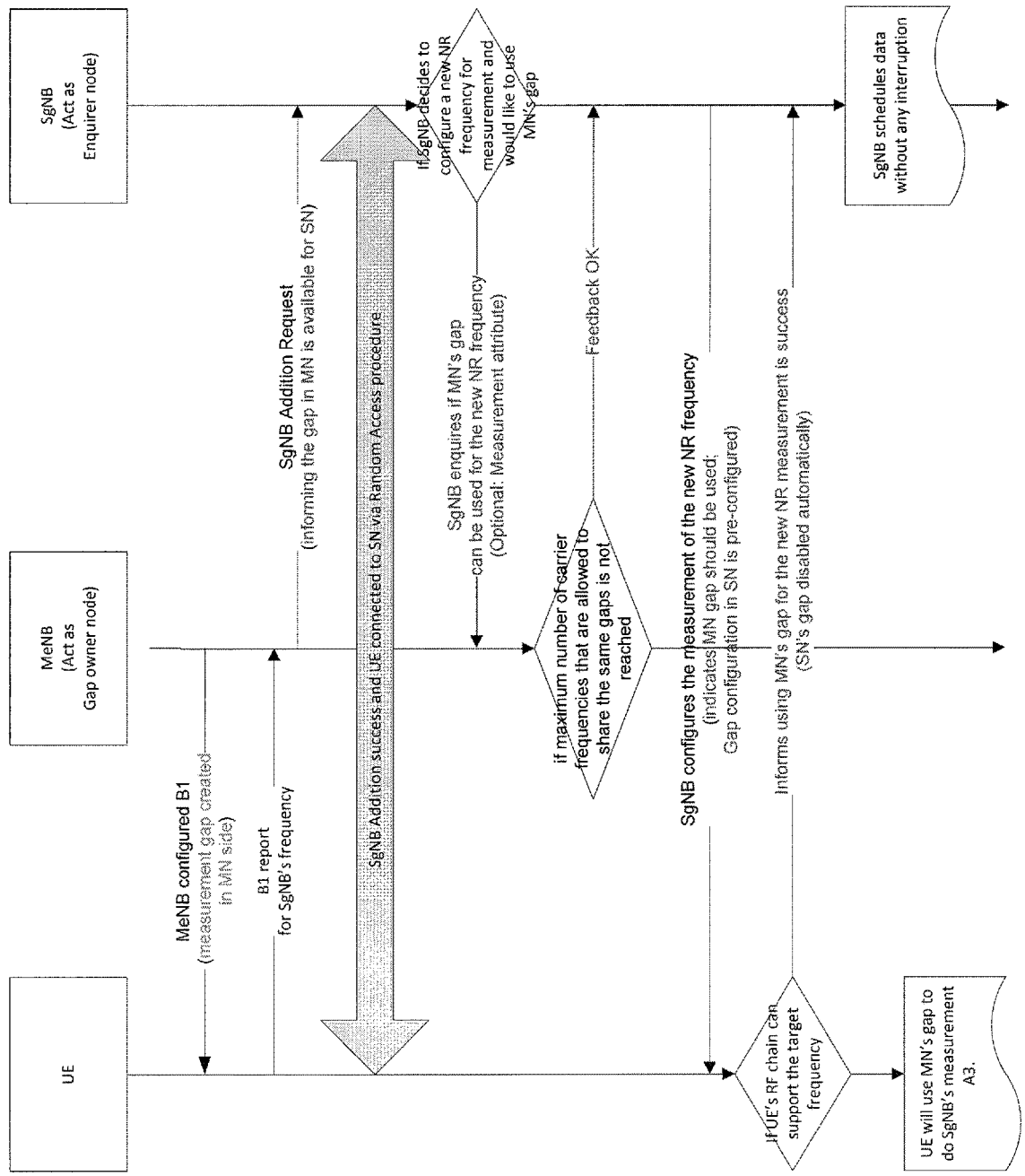
FIG. 4B illustrates a success case, in which the user equipment automatically disables a pre-configured gap, according to certain embodiments.

FIG. 4B illustrates a success case, in which the user equipment automatically disables a pre-configured gap, according to certain embodiments. As shown in FIG. 4B, the MeNB can permit its own gap to be used by SgNB's measurement. Due to UE capabilities, e.g. UE's RF chain, UE may support the target frequency. In this case, the UE may automatically disable a pre-configured gap in the SN side for SgNB's measurement and informs SgNB that the pre-configured gap is disabled.

Figure 5:
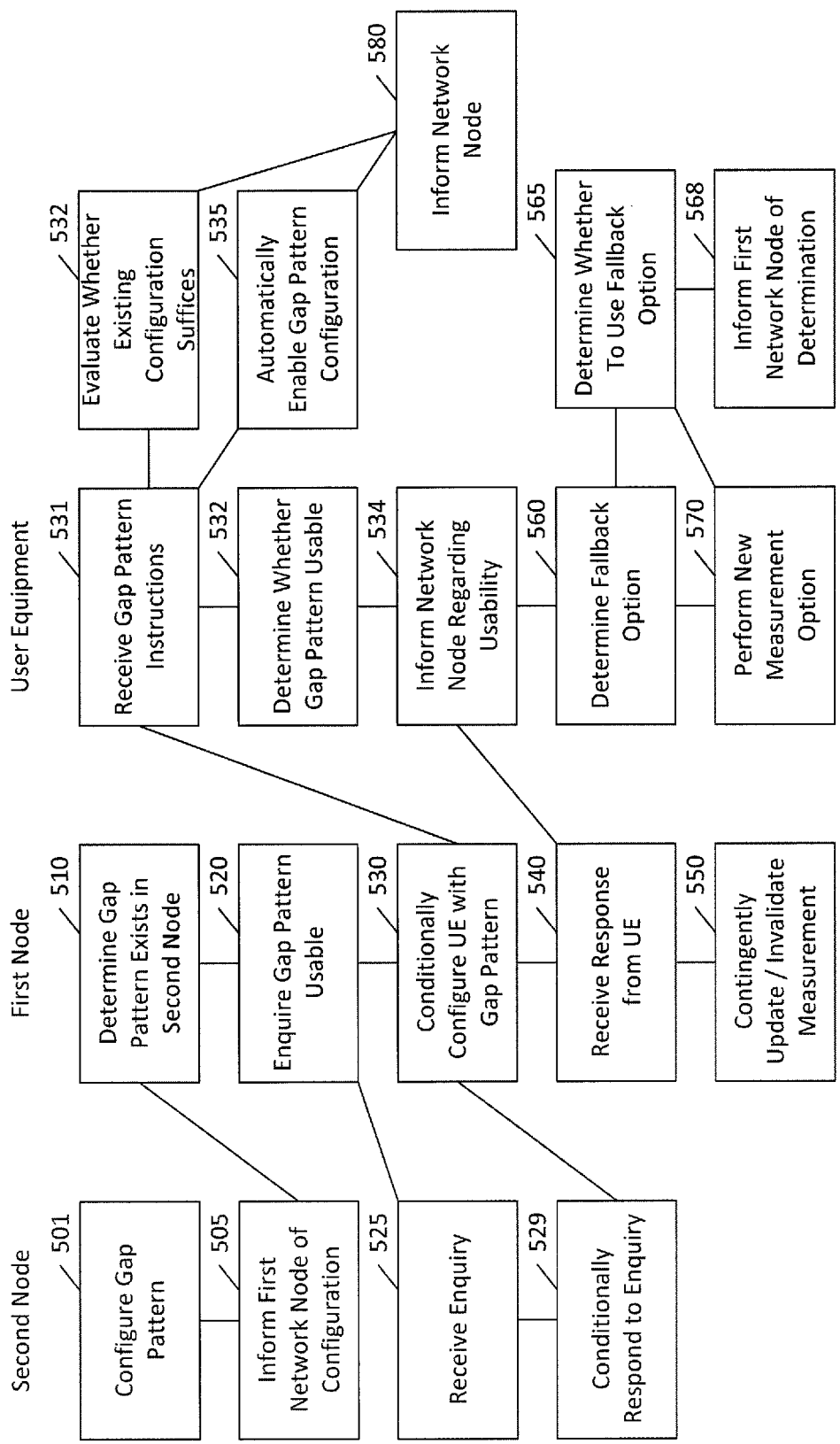
FIG. 5 illustrates a method according to certain embodiments.

FIG. 5 illustrates a method according to certain embodiments. As shown in FIG. 5, a method can include, at 510, determining, by a first network node (for example the enquirer node discussed above), that a gap pattern is existing in a second network node (for example, the gap owner node discussed above). The method can also include, at 520, enquiring, by the first network node to the second network node, whether the gap pattern can be used for a new measurement. The method can further include, at 530, configuring, by the first network node, a user equipment to perform the new measurement in the gap pattern of the second network node or in a gap pattern of the first network node, based on a response from the second network node to the enquiring.

The configuring can include configuring the user equipment to perform the new measurement in the gap pattern of the second network node when the response from the second network node indicates that the gap pattern of the second network node can be used (see, for example, FIGS. 1, 3, 4A, and 4B).

The configuring can include not configuring the user equipment to perform the new measurement in the gap pattern of the second network node when the response from the second network node indicates that the gap pattern of the second network node cannot be used (see, for example, FIG. 2). In this case, the configuring can include configuring the user equipment to perform the new measurement in the gap pattern of the first network node.

The method can also include, at 540, receiving, by the first network node, a response from the user equipment to the configured new measurement. The method can further include, at 550, contingently updating or invalidating, by the first network node, the new measurement configuration based on the response from the user equipment.

The updating can include comprises not scheduling the user equipment to perform the new measurement when the response from the user equipment indicates that the new measurement to use the gap pattern configured in the second network is a failure (see, for example, FIGS. 3 and 4A). The updating can include scheduling the user equipment to perform the new measurement when the response from the user equipment indicates that the new measurement to use the gap pattern configured in the second network is a success (see, for example, FIGS. 1 and 4B).

The method can include, at 501, configuring, by a second network node, a gap pattern for a user equipment. The method can also include, at 505, informing, by the second network node to a first network node, that the gap pattern is configured. The method can further include, at 525, receiving, by the second network node from the first network node, an enquiry regarding whether the gap pattern can be used for a new measurement. The method can further include, at 529, conditionally responding, by the second network, to the enquiry based on usage of the gap pattern.

The conditionally responding can include sending permission to use the gap pattern when such permission would not exceed a sharing limit of the gap pattern (see, for example, FIGS. 1, 3, 4A, and 4B). The sharing limit can be the maximum number of measurement frequencies using one gap, as discussed above. For example, as explained in more detail above the limit may be expressed in terms of X+Y+Z, where X is the maximum number of Measurement A attribute, Y is the maximum number of Measurement B attribute and Z is the maximum number of Measurement C attribute. The conditionally responding can include sending a denial of permission to use the gap pattern when such permission would exceed a sharing limit of the gap pattern (see, for example, FIG. 2).

The method can include, at 531, receiving, by a user equipment, instructions from a first network node to use a gap pattern configured by a second network node for a new measurement. The method can also include, at 532, determining, by the user equipment, whether using the gap pattern as instructed is possible. The method can further include, at 534, informing the first network node, by the user equipment, whether the gap pattern usage is possible.

The determining can involve determining whether a radio frequency chain of the user equipment supports a target frequency for the new measurement (see, for example, FIGS. 1, 3, 4A, and 4B).

The method can also include at 560, determining, by the user equipment, a fallback option for the new measurement. The method can further include, at 570, performing, by the user equipment, the new measurement using the fallback option when the gap pattern usage is not possible. The fallback option can be received with the instructions at 531 (see, for example, FIGS. 4A and 4B) or responsive to the informing at 534 (see, for example, FIG. 3).

The method can further include, at 565, determining, by the user equipment, whether to use the fallback option. Moreover, the method can include, at 568, informing the first network node of the determination.

As mentioned above, at 531, the user equipment can receive gap pattern instructions. As an alternative to the embodiments described above, the network may configure the UE with a measurement configuration including a gap pattern, reflecting targeted performance. The UE can enable the gap in the Enquirer node side automatically based on pre-configured gap configuration to do measurement and inform network accordingly, whether the gaps are needed or not. The Enquirer node also can simply configure a gap pattern even without an inter-node coordination procedure. The UE can evaluate, for example based on implementation and configuration, whether it can use an existing gap pattern to fulfil the minimum measurement performance without the new GP. If so, the UE can inform the gNB that the new GP is implicitly released or enabled.

Thus, the method can include, at 531, receiving, by a user equipment, a gap pattern configuration from a network node. The method can also include, at 580, informing, by the user equipment, the network node regarding usage of the gap pattern for measurements by the user equipment.

The method can also include, at 535, automatically enabling the gap pattern configuration. In this case, the informing at 580 can include informing the network node regarding whether the gap pattern is needed for the user equipment.

The method can further include, at 538, evaluating whether an existing gap pattern can fulfill a minimum measurement performance with the gap pattern configuration. In this case, the informing at 538 can include informing the network node that the gap pattern configuration is released or enabled based on the evaluation.

Figure 6:
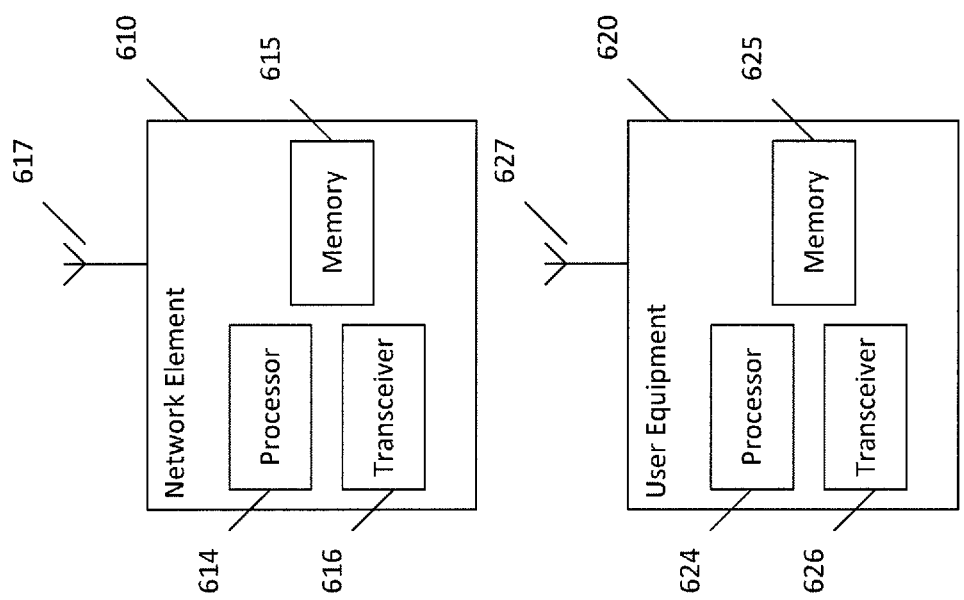
FIG. 6 illustrates a system according to certain embodiments.

FIG. 6 illustrates a system according to certain embodiments of the invention. It should be understood that each block of the flowchart of FIG. 5 may be implemented by various means or their combinations, such as hardware, software, firmware, one or more processors and/or circuitry. In one embodiment, a system may include several devices, such as, for example, network element 610 and user equipment (UE) or user device 620. The system may include more than one UE 620 and more than one network element 610, although only one of each is shown for the purposes of illustration. A network element can be an access point, a base station, an eNode B (eNB), a next generation Node B (gNB), or any other network element, such as a master base station or a secondary base station, including those shown in FIGS. 1-4. Each of these devices may include at least one processor or control unit or module, respectively indicated as 614 and 624. At least one memory may be provided in each device, and indicated as 615 and 625, respectively. The memory may include computer program instructions or computer code contained therein, for example for carrying out the embodiments described above. One or more transceiver 616 and 626 may be provided, and each device may also include an antenna, respectively illustrated as 617 and 627. Although only one antenna each is shown, many antennas and multiple antenna elements may be provided to each of the devices. Other configurations of these devices, for example, may be provided. For example, network element 610 and UE 620 may be additionally configured for wired communication, in addition to wireless communication, and in such a case antennas 617 and 627 may illustrate any form of communication hardware, without being limited to merely an antenna.

Transceivers 616 and 626 may each, independently, be a transmitter, a receiver, or both a transmitter and a receiver, or a unit or device that may be configured both for transmission and reception. The transmitter and/or receiver (as far as radio parts are concerned) may also be implemented as a remote radio head which is not located in the device itself, but in a mast, for example. It should also be appreciated that according to the "liquid" or flexible radio concept, the operations and functionalities may be performed in different entities, such as nodes, hosts or servers, in a flexible manner. In other words, division of labor may vary case by case. One possible use is to make a network element to deliver local content. One or more functionalities may also be implemented as a virtual application that is provided as software that can run on a server.

A user device or user equipment 620 may be a mobile station (MS) such as a mobile phone or smart phone or multimedia device, a computer, such as a tablet, provided with wireless communication capabilities, personal data or digital assistant (PDA) provided with wireless communication capabilities, vehicle, portable media player, digital camera, pocket video camera, navigation unit provided with wireless communication capabilities or any combinations thereof. The user device or user equipment 620 may be a sensor or smart meter, or other device that may usually be configured for a single location.

In an exemplifying embodiment, an apparatus, such as a node or user device, may include means for carrying out embodiments described above in relation to FIGS. 1-5.

Processors 614 and 624 may be embodied by any computational or data processing device, such as a central processing unit (CPU), digital signal processor (DSP), application specific integrated circuit (ASIC), programmable logic devices (PLDs), field programmable gate arrays (FPGAs), digitally enhanced circuits, or comparable device or a combination thereof. The processors may be implemented as a single controller, or a plurality of controllers or processors. Additionally, the processors may be implemented as a pool of processors in a local configuration, in a cloud configuration, or in a combination thereof. The term circuitry may refer to one or more electric or electronic circuits. The term processor may refer to circuitry, such as logic circuitry, that responds to and processes instructions that drive a computer.

For firmware or software, the implementation may include modules or units of at least one chip set (e.g., procedures, functions, and so on). Memories 615 and 625 may independently be any suitable storage device, such as a non-transitory computer-readable medium. A hard disk drive (HDD), random access memory (RAM), flash memory, or other suitable memory may be used. The memories may be combined on a single integrated circuit as the processor, or may be separate therefrom. Furthermore, the computer program instructions may be stored in the memory and which may be processed by the processors can be any suitable form of computer program code, for example, a compiled or interpreted computer program written in any suitable programming language. The memory or data storage entity is typically internal but may also be external or a combination thereof, such as in the case when additional memory capacity is obtained from a service provider. The memory may be fixed or removable.

The memory and the computer program instructions may be configured, with the processor for the particular device, to cause a hardware apparatus such as network element 610 and/or UE 620, to perform any of the processes described above (see, for example, FIGS. 1-5). Therefore, in certain embodiments, a non-transitory computer-readable medium may be encoded with computer instructions or one or more computer program (such as added or updated software routine, applet or macro) that, when executed in hardware, may perform a process such as one of the processes described herein. Computer programs may be coded by a programming language, which may be a high-level programming language, such as objective-C, C, C++, C#, Java, etc., or a low-level programming language, such as a machine language, or assembler. Alternatively, certain embodiments of the invention may be performed entirely in hardware.

Furthermore, although FIG. 6 illustrates a system including a network element 610 and a UE 620, embodiments of the invention may be applicable to other configurations, and configurations involving additional elements, as illustrated and discussed herein. For example, multiple user equipment devices and multiple network elements may be present, or other nodes providing similar functionality, such as nodes that combine the functionality of a user equipment and an access point, such as a relay node.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would

LIST OF ABBREVIATIONS

CC Carrier Component
DC Dual Connectivity
eNB evolved Node-B
EN-DC E-UTRAN-NR Dual Connectivity
E-UTRAN Evolved Universal Terrestrial Radio Access Network
gNB 5G Node-B
LTE Long Term Evolution
MeNB Master eNB
MN Master Node
MR DC Multi-RAT Dual Connectivity
NR New Radio
RAT Radio Access Technology
SgNB Secondary gNB
SN Secondary Node
UE User Equipment

What is claimed is:

1. An apparatus, comprising:
  at least one processor;
  at least one memory including computer program code, wherein the at least one memory and the computer program code are configured to, with the at least one processor, cause the apparatus at least to:
  receive, by a user equipment, instructions from a master base station to use a gap pattern configured by a secondary base station for a new measurement;
  determine by the user equipment whether using the gap pattern as instructed is possible; and
  inform by the user equipment the master base station whether the gap pattern usage is possible.

2. The apparatus of claim 1, wherein the determining comprises determining whether a radio frequency chain of the apparatus supports a target frequency for the new measurement.

3. The apparatus of claim 1, wherein the at least one memory and the computer program code are configured to, with the at least one processor, cause the apparatus at least to:
  determine a fallback option for the new measurement, wherein the fallback option comprises use of a gap pattern configured in the master base station; and
  perform the new measurement using the fallback option when the gap pattern usage is not possible.

4. The apparatus of claim 3, wherein the fallback option is explicitly configured at the master base station to be used when using the gap pattern of the secondary base station is not possible.

5. The apparatus of claim 3, wherein the at least one memory and the computer program code are configured to, with the at least one processor, cause the apparatus at least to:
  determine whether to use the fallback option; and
  inform the master base station of the determination.

6. The apparatus of claim 1 comprising the user equipment or is comprised in the user equipment.

7. An apparatus, comprising:
  at least one processor;
  at least one memory including computer program code, wherein the at least one memory and the computer program code are configured to, with the at least one processor, cause the apparatus at least to:
  by a user equipment in communication with first and second network nodes, receive from the second network node a gap pattern configuration configured by the second network node; and
  in response to receiving a measurement configuration for the received gap pattern configuration from the first network node, inform by the user equipment to the first network node that the received gap pattern configuration can be used by the user equipment for measurements,
  wherein the first network node is different from the second network node.

8. The apparatus of claim 7, wherein the at least one memory and the computer program code are further configured to, with the at least one processor, cause the apparatus at least to:
  automatically enable the received gap pattern configuration, wherein the informing comprises informing the network node regarding whether the received gap pattern configuration is needed for the user equipment.

9. The apparatus of claim 7, wherein the at least one memory and the computer program code are configured to, with the at least one processor, cause the apparatus at least to:
  evaluate whether an assigned gap pattern can fulfill a minimum measurement performance associated with the received gap pattern configuration, wherein the informing comprises informing the network node that the received gap pattern configuration is one of released or enabled based on the evaluation.

10. The apparatus of claim 7 comprising the user equipment or is comprised in the user equipment.

11. An apparatus, comprising:
  at least one processor;
  at least one memory including computer program code, wherein the at least one memory and the computer program code are configured to, with the at least one processor, cause the apparatus at least to:
  determine by a master network node that a gap pattern used by a secondary network node is assigned in the secondary network node;
  enquire, by the master network node to the secondary network node, whether the gap pattern can be used for a new measurement; and
  configure a user equipment to perform the new measurement in the gap pattern of used by the secondary network node in response to the secondary network node indicating the gap pattern can be used for the new measurement or in a gap pattern used by the master network node in response to the secondary network node indicating the gap pattern cannot be used for the new measurement.

12. The apparatus of claim 11, wherein the configuring comprises configuring the user equipment to perform the new measurement in the gap pattern of the secondary network node when the response from the secondary network node indicates that the gap pattern of the secondary network node can be used.

13. The apparatus of claim 11, wherein the configuring comprises not configuring the user equipment to perform the new measurement in the gap pattern of the secondary network node when the response from the secondary network node indicates that the gap pattern of the secondary network node cannot be used.

14. The apparatus of claim 11, wherein the configuring comprises configuring the user equipment to perform the new measurement in the gap pattern of the master network node when the response from the secondary network node indicates that the gap pattern of the secondary network node cannot be used.

15. The apparatus of claim 14, wherein the gap pattern of the master network node comprises a previously existing gap pattern of the master network node or a newly configured gap pattern of the master network node.

16. The apparatus of claim 11, wherein the at least one memory and the computer program code are further configured to, with the at least one processor, cause the apparatus at least to:
   receive a response from the user equipment to the configured new measurement; and
   update or invalidate the new measurement configuration based on the response from the user equipment.

17. The apparatus of claim 16, wherein the updating comprises not scheduling the user equipment to perform the new measurement when the response from the user equipment indicates that the new measurement to use the gap pattern configured in the secondary network node is a failure.

18. The apparatus of claim 16, wherein the updating comprises scheduling the user equipment to perform the new measurement when the response from the user equipment indicates that the new measurement to use the gap pattern configured in the secondary network node is a success.

19. The apparatus of claim 11 comprising a network node.

* * * * *